Oct. 21, 1930.    C. L. RILEY    1,779,336
NEBULIZATION OF FLUIDS
Filed March 24, 1926    2 Sheets-Sheet 1

INVENTOR.
CHAMPLAIN L. RILEY
BY
ATTORNEYS.

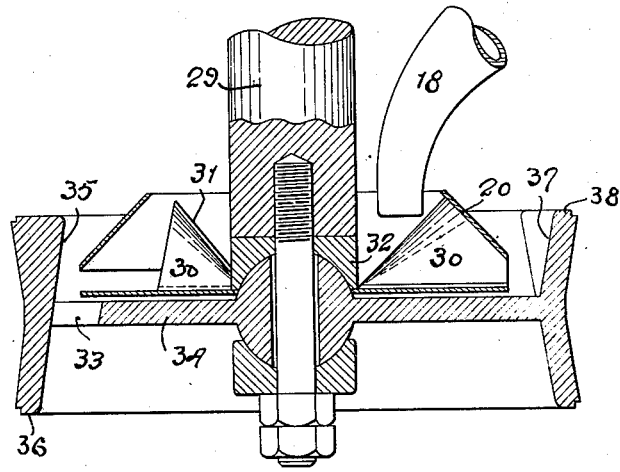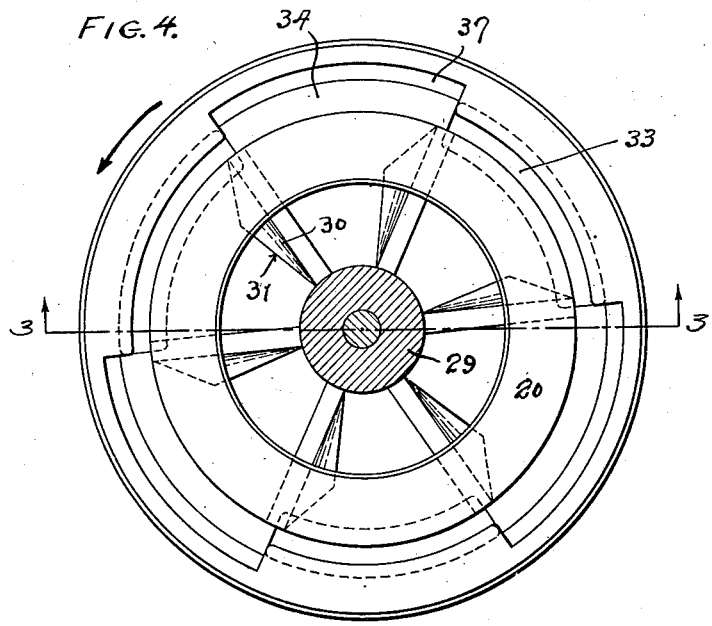

Patented Oct. 21, 1930

1,779,336

UNITED STATES PATENT OFFICE

CHAMPLAIN L. RILEY, OF NORTH PLAINFIELD, NEW JERSEY, ASSIGNOR TO INDUSTRIAL ASSOCIATES, INCORPORATED, OF NEW YORK, N. Y., A CORPORATION OF NEW YORK

NEBULIZATION OF FLUIDS

Application filed March 24, 1926. Serial No. 97,136.

My invention relates to nebulization of fluids, and particularly to nebulization by high speed rotors. The present invention is somewhat related to the subject matter of my Patents 1,624,847 and 1,676,113, which deal, however, with the nebulization of mobile fluids rather than with thick or viscous fluids, such as concentrates, sludges, muds, and the like, for which the present apparatus is eminently appropriate.

Viewed broadly the present invention contemplates the positive acceleration of the fluid (using the word "fluid" in a sense broad enough to include sluggishly mobile masses) to a very high speed—for example, a linear speed approximating two miles a minute—followed by distribution of the accelerated fluid and the final centrifugal dispersal of the distributed fluid. The high linear speed imparted to the fluid by its positive acceleration, followed by the distribution and centrifugal off-throw of the liquid in attenuated form, effects an extremely fine nebulization thereof.

From the standpoint of apparatus the invention contemplates broadly a group of impellers which positively accelerate the liquid and centrifugally discharge the same from their peripheral margins, in combination with a surrounding distributor or baffle which receives the centrifugal discharge from the impellers and causes its peripheral distribution around the distributor and its consequent attenuation before final discharge by centrifugal force into the surrounding atmosphere. The concentrated discharge from the end of the impellers is thus peripherally distributed not only with resulting attenuation, but also with a more even distribution at all points around the distributor.

While apparatus of this character is thoroughly efficient to effect nebulization of mobile fluids, its field of utility is augmented by the fact that it is capable of nebulizing heavy or thick liquids such as muds, which, so far as I am aware, have not hitherto been successfully nebulized.

In the accompanying drawings—

Fig. 3 is a section on the line 3—3, Fig. 4, through a modified construction; and Fig. 4 is a top plan view of the rotor of this modification with the driving shaft in section.

Figure 1:
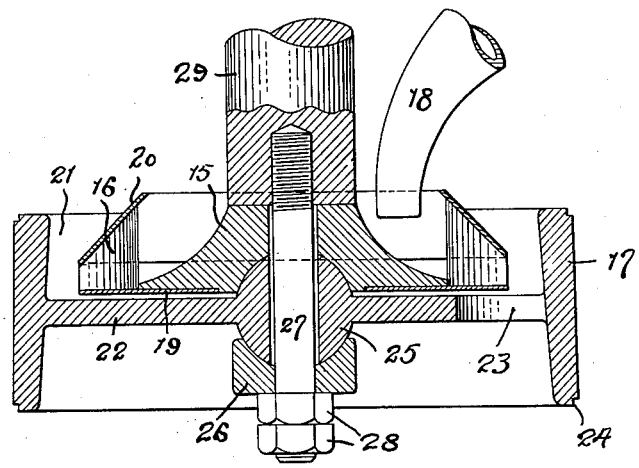
Fig. 1 is a vertical section on the line 1—1, Fig. 2, with a nebulizer in which my invention is embodied in one form.

In the form shown in Fig. 1 the principal elements of the neubilizer are three, viz., spreader 15, impellers 16 and distributor 17. The spreader 15 comprises a substantially conical member to which the fluid is delivered from the feed 18. The impeller comprises a series of impeller buckets 16 carried by a disc 19 and united at their upper margins by a conical splash hood 20. The distributor comprises an annulus with inner peripheral surface 21 inclined to the axis of rotation of the unit, and a support in the form of a web 22 apertured at 23 adjacent the distributing surface to permit the passage of fluid therethrough to the throw-off lip 24 at the lower margin of the annulus. The supporting web 22 has a spherical hub 25 engaged between the cupped seats in the lower face of the cone 15 and in the upper face of the bearing block 26, all of the parts being pierced in register to receive the screw pin 27 by the nuts 28 by which the nebulizer unit is clamped in driving engagement with the rotary shaft 29. Preferably the pin passageway in the hub 25 is of sufficient diameter to permit a certain angular play of the annulus 17 with respect to the axis of rotation, by which an automatic adjustment position takes place during the operation. While the parts are all machined to insure as exact symmetry as possible, inaccuracies are practically unavoidable, and I have found that by providing a connection which permits the ring to automatically adjust itself to the axis of rotation, the vibrations which otherwise occur, due to unbalanced conditions, are avoided.

In operation the nebulizer is driven at a very high speed of rotation, say 5,000 to 10,000 revolutions per minute or more. The fluid delivered to the cone 15 is in part splashed or thrown off by centrifugal force against the hood 20, and in part it is distributed outward along the surface of the cone 15. As the liquid moves outward under the influence of centrifugal force, it comes into the path of the impellers 16 by which it is positively engaged and brought up to the very high rotary speed of the unit. The impeller blades 16 are preferably sharpened at their leading margins to cut the liquid without splash, and are preferably dished to reduce shock of impact, and also to increase the centrifugal off-fling speed. The liquid discharged from the peripheral margins of the several impellers is flung violently outward in a more or less vertical sheet against the distributing surface 21 of the annulus 17. The discharge against the surface 21 is set at such high velocity that a certain nebulization of the liquid results from the impact, but in large part the liquid striking the surface 17 is peripherally distributed by the latter and is caused by centrifugal force to follow its downward incline, passing through the holes 23 in the web 22 and eventually escaping in attenuated condition at the throw-off lip 24. At the moment of escape the liquid is not only subjected to the centrifugal off-throw velocity, but also to the high velocity positively imparted thereto by the impellers 16. Its linear speed at the moment of throw-off is therefore very great, and the forces of disassociation resulting from this high velocity, combined with the impact of the attenuated particles against the surrounding atmosphere, result in an extremely fine nebulization which is ideal for spray drying operations.

It may be pointed out furthermore that the impellers 16 function not only as means for positively driving the liquid, but also as fan blades which create a current of air flowing inward through the central opening in the hood 20 and discharging between the outer margins of the hood 20 and disc 19 against the distributor wall 21. Portion of the air current passes upward and outward, carrying with it the nebula formed by impact of the fluid against the distributing surface 21. In part the air current follows the downward incline of the surface 21, and passing through the apertures 23 in the web, escapes from the lower portion of the unit. A circulation of air is thus effected by the impellers 16, which is beneficial to the operation of the nebulizer.

An advantage of the construction illustrated, resides in the independence of the annulus 17 from the impeller 16. The arrangement permits the annulus to be mounted in reverse position, if an upward discharge alone is desired. Moreover, it permits various forms of distributing annuli to be utilized with a single impeller unit. While this construction has the advantages specified, it is obvious that the operating efficiency of the nebulizer is attained in a structure in which the parts are rigid with respect to each other, so that for change of direction or character of the spray, the entire unit must be replaced by another having the characteristic features of the invention.

Figure 2:
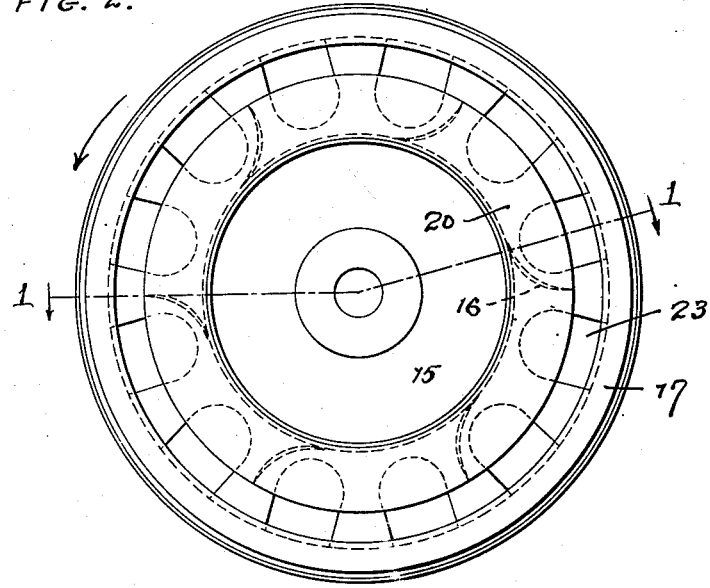
Fig. 2 is a top plan view of the same detached from its driving shaft.

The construction shown in Figs. 3 and 4 illustrates a modification differing in certain details from that of Figs. 1 and 2. Here the spreading cone is omitted, the liquid from the feed 18 falling directly into the path of impellers 30. The margins 31 of the latter are inclined to the axis of rotation and extend downward from the inner margin of the hood 20 to the cylindrical hub 32 of the impeller unit. The blades 30 are also warped or bent to present the margin 31 in advance of the body of the blade. This construction not only minimizes the shock of impact by the blade against the feed stream, but by sharpening the leading edge 31, splash is prevented as the blade enters the stream.

The distributing annulus is also modified to effect centrifugal off-throw from both upper and lower margins. For this purpose the inner periphery is shaped to present in register with the spaced apertures 33 in the web 34, facets 35 which are downwardly and outwardly inclined to the bottom throw-off lip 36. Intermediate the facets 35 are facets 37 which are upwardly and outwardly inclined from the web 34 to the upper marginal throw-off lip 38. By this arrangement the portions of the fluid which follow the facets 35 are discharged from the lower margin of the distributing annulus, while those portions which follow the facets 37 are discharged at the upper margin of the annulus.

In operation the stream of fluid discharged from 18 is cut by the leading margin 31 of the several blades 30 as the rotor is propelled at the high speed previously mentioned. The portions of the stream thus cut off and carried around by the several blades are brought to high linear speed positively by the blades. The fluid is also flung outwardly by centrifugal force from the outer margins of the blades against the distributing annulus. In part it is nebulized and carried off by the current of air above mentioned, and in part it is caused to follow the facets 35 and 37 to the opposite throw-off lips 36 and 38.

In both of the constructions the distributing annulus receives the liquid discharged by centrifugal force from the impeller blades after high peripheral speed has been imparted to the liquid, and distributes the liquid circumferentially around the annulus before its escape therefrom by centrifugal force. This is a highly desirable characteristic for the attainment of uniform distribution into the surrounding atmosphere of the work chamber.

The present apparatus is capable of finely nebulizing concentrates, muds, sludges, etc., as well as mobile liquids, thus bringing the material into the best possible condition for spray drying. Preferably the distributor annulus and its web are integral and are cut from tool steel, since the stresses which are set up within the distributor at the very high speed employed are such that, so far as I am aware at the present time, only metal of this character possesses tensile strength sufficient to withstand the internal stresses which are set up. The blades may be formed from plate steel, as also the carrier ring and hood, the parts being welded or otherwise suitably secured together and to the impeller hub.

As stated above the efficiency of the apparatus is in no way dependent upon the separate construction of its various parts, it being possible to embody the essential features in a one-piece unit in which the blades are integral with the distributor annulus.

Various modifications in detail will readily occur to those dealing with the problem which do not depart from what I claim as my invention.

I claim:—

1. The method of nebulizing a fluid which comprises imparting to the fluid a rotation at high linear speed combined with a movement away from the axis, attenuating the fluid stream by impeding its movement away from the axis and deflecting the stream to a direction substantially axial but inclined outwardly, then discharging the attenuated stream centrifugally.

2. The method of nebulizing a fluid which comprises imparting to a circular series of streams of the fluid a rotation at high speed combined with a movement away from the axis of rotation, attenuating the said streams by impeding the radial movement and deflecting the streams toward an axial direction, then discharging the attenuated fluid centrifugally.

3. The method of nebulizing a stream of liquid which comprises positively rotating and centrifugally dispersing the liquid, dividing and deflecting the flow of the dispersed liquid in opposite substantially axial but outwardly inclined directions and discharging the divided portions centrifugally in different planes.

4. The method of nebulizing a stream of fluid which comprises centrifugally dispersing the stream, dividing and deflecting the flow of the dispersed liquid in opposite substantially axial but outwardly inclined directions and centrifugally discharging the divided portions of the liquid in different planes.

5. A centrifugal nebulizing rotor having a peripheral discharge liquid impeller bounded by a peripheral deflector having its inner face extending in a direction substantially axial but outwardly inclined and having throw-off lips on an end margin to which the liquid stream is deflected.

6. A centrifugal nebulizing rotor having a peripheral discharge liquid impeller bounded by a peripheral deflector having flow channels in its inner face extending in a direction substantially axial but inclined outwardly and having throw-off lips to which said channels deliver.

7. The method of nebulizing a fluid stream, which comprises spreading the same around an axis as a radially flowing sheet, dividing the radially flowing sheet into a circumferential series of sub-divisions and positively propelling said sub-divisions at increased linear and radial speed, deflecting the sub-divisions from their radial path into a substantially axial but outwardly inclined path and discharging the deflected sub-divisions centrifugally.

8. A rotary nebulizer comprising an annular member having an inner face forming a flow surface extending in a direction substantially axial but inclined outwardly and a centrifugal vane impeller within said annular member, said impeller being located to deliver against the said inner face, said impeller and annulus being connected to rotate together.

9. A rotary nebulizer comprising an annular member having an inner face with a series of flow channels extending in a direction substantially axial but inclined outwardly, together with a centrifugal impeller within the said member and adapted to deliver against the said inner face.

10. A nebulizing rotor having a central chamber for receiving material to be nebulized and means forming discharge lips on the upper and lower surfaces of said rotor, together with an axially extending wall outward from said chamber and shaped to provide two series of channels adapted to receive material from said chamber, one series opening to the upper discharge lip and the other to the lower discharge lip.

11. A nebulizing rotor having a central chamber for receiving material to be nebulized and means forming discharge lips on the upper and lower surfaces of said rotor, together with an axially extending wall outward from said chamber and shaped to provide two series of channels adapted to receive material from said chamber, one series opening to the upper discharge lip and the other to the lower discharge lip, said channels being inclined, from the respective lips to which they open, toward the rotative axis of the rotor.

12. A nebulizing rotor having a central chamber, means for introducing to said chamber a material to be nebulized, and means forming discharge lips on the upper and lower surfaces of said rotor, together with an axially extending wall outward from said chamber and shaped to provide a circular series of equally spaced channels extending from said upper lip downwardly and inwardly to said chamber, and a circular series of equally spaced channels extending from said lower lip upwardly and inwardly to said chamber.

In testimony whereof I have signed my name to this specification.

CHAMPLAIN L. RILEY.